US010816014B2

United States Patent
Nasir et al.

(10) Patent No.: US 10,816,014 B2
(45) Date of Patent: Oct. 27, 2020

(54) SYSTEMS AND METHODS FOR TURBINE ENGINE PARTICLE SEPARATION

(71) Applicant: HONEYWELL INTERNATIONAL INC., Morris Plains, NJ (US)

(72) Inventors: Shakeel Nasir, Torrance, CA (US); John Schugardt, Chandler, AZ (US); Mahmoud Mansour, Phoenix, AZ (US); Richard Bonvouloir, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 81 days.

(21) Appl. No.: 16/044,704

(22) Filed: Jul. 25, 2018

(65) Prior Publication Data
US 2020/0032818 A1 Jan. 30, 2020

(51) Int. Cl.
*F04D 29/70* (2006.01)
*F02C 3/08* (2006.01)
(Continued)

(52) U.S. Cl.
CPC .......... *F04D 29/701* (2013.01); *B01D 45/04* (2013.01); *B01D 45/12* (2013.01); *F01D 1/14* (2013.01);
(Continued)

(58) Field of Classification Search
CPC .... F02C 7/30; F02C 7/052; F02C 3/08; F02C 6/08; F02C 9/18; F04D 29/44;
(Continued)

(56) References Cited

U.S. PATENT DOCUMENTS 3,751,907 A * 8/1973 Anderson ............... F02C 7/052
60/39.092
3,832,086 A 8/1974 Hull, Jr. et al.
(Continued)

FOREIGN PATENT DOCUMENTS

| EP | 1874626 A2 | 1/2008 |
|----|------------|--------|
| EP | 3324019 A1 | 5/2018 |
| JP | 2002242699 A | 8/2002 |

OTHER PUBLICATIONS

Extended EP Search Report for Application No. 17200875.7 dated Apr. 5, 2018.
(Continued)

*Primary Examiner* — Alain Chau
(74) *Attorney, Agent, or Firm* — Lorenz & Kopf, LLP

(57) ABSTRACT

A turbine engine incorporating a fine particle separation means. The turbine engine includes: a compressor, a diffuser, and a flow path positioned downstream from the diffuser, wherein the flow path comprises an outer annular wall and an inner annular wall between which the compressed air flows, and wherein the flow path comprises an arc that redirects the compressed air from flowing in a substantially radial flow direction to a substantially axial flow direction. The turbine engine further includes an extraction slot in the outer annular wall that fluidly connects with a scavenge plenum, the extraction slot also being positioned downstream axially along the flow path from the arc. The turbine engine further includes an aspiration slot, downstream from the extraction slot, that allows air from the plenum to recirculate back into the flow path.

9 Claims, 6 Drawing Sheets

(51) Int. Cl.
  F04D 29/44   (2006.01)
  B01D 45/12   (2006.01)
  F01D 25/32   (2006.01)
  B01D 45/04   (2006.01)
  F01D 1/14    (2006.01)
  F02C 7/052   (2006.01)

(52) U.S. Cl.
  CPC .............. *F01D 25/32* (2013.01); *F02C 3/08* (2013.01); *F02C 7/052* (2013.01); *F04D 29/444* (2013.01); *F05B 2260/63* (2013.01); *F05D 2260/607* (2013.01)

(58) Field of Classification Search
  CPC .. F04D 29/441; F04D 29/444; F04D 29/4213; F04D 29/682; F04D 29/70; F04D 29/701; F05D 2260/607; F05B 2260/63; B01D 45/04; B01D 45/12; B01D 45/16; F01D 9/14; F01D 25/32
  See application file for complete search history.

(56) References Cited

U.S. PATENT DOCUMENTS

| | | | |
|---|---|---|---|
| 3,993,463 A | 11/1976 | Barr | |
| 4,100,732 A * | 7/1978 | Bryans | F02C 3/08 60/804 |
| 4,292,050 A | 9/1981 | Linhardt et al. | |
| 4,463,552 A | 8/1984 | Monhardt et al. | |
| 4,685,942 A | 8/1987 | Klassen et al. | |
| 4,981,018 A * | 1/1991 | Jones | F02C 3/08 415/143 |
| 5,123,240 A | 6/1992 | Frost et al. | |
| 5,201,801 A | 4/1993 | Smith, Jr. | |
| 6,447,241 B2 * | 9/2002 | Nakao | F04D 29/4213 415/1 |
| 6,499,285 B1 | 12/2002 | Snyder | |
| 7,137,777 B2 | 11/2006 | Fried et al. | |
| 7,296,395 B1 | 11/2007 | Hartman et al. | |
| 7,374,593 B2 | 5/2008 | Snyder | |
| 7,569,094 B2 | 8/2009 | Kane et al. | |
| 7,581,397 B2 | 9/2009 | Strangman et al. | |
| 7,658,061 B2 | 2/2010 | Kawamoto et al. | |
| 7,678,165 B2 | 3/2010 | Tingle et al. | |
| 7,802,433 B2 | 9/2010 | Higgins | |
| 7,874,158 B2 | 1/2011 | O'Neill et al. | |
| 7,922,784 B2 | 4/2011 | Saeed et al. | |
| 7,927,408 B2 | 4/2011 | Sheoran et al. | |
| 7,967,554 B2 | 6/2011 | Bremer | |
| 8,092,145 B2 | 1/2012 | Martel et al. | |
| 8,256,277 B2 | 9/2012 | Khibnik et al. | |
| 8,512,450 B2 | 8/2013 | Kazlauskas et al. | |
| 8,539,775 B1 | 9/2013 | Wong | |
| 8,679,210 B2 | 3/2014 | McAuliffe et al. | |
| 8,943,791 B2 | 2/2015 | Tibbott et al. | |
| 8,945,254 B2 | 2/2015 | Mayer et al. | |
| 9,027,202 B2 | 5/2015 | Huang | |
| 9,046,056 B2 | 6/2015 | Lerg | |
| 9,206,693 B2 | 12/2015 | Hynum et al. | |
| 9,314,723 B2 | 4/2016 | Judd et al. | |
| 9,377,030 B2 * | 6/2016 | Matwey | F04D 29/444 |
| 9,546,603 B2 * | 1/2017 | Meier | F04D 29/441 |
| 10,167,725 B2 * | 1/2019 | Manning | F01D 5/147 |
| 2007/0144139 A1 | 6/2007 | Kawamoto et al. | |
| 2007/0183890 A1 * | 8/2007 | Nolcheff | F01D 9/02 415/191 |
| 2007/0235373 A1 | 10/2007 | Strangman et al. | |
| 2008/0152500 A1 | 6/2008 | Mehring | |
| 2008/0310951 A1 * | 12/2008 | Bremer | F01D 5/081 415/121.2 |
| 2012/0131900 A1 | 5/2012 | Kenyon et al. | |
| 2014/0237954 A1 | 8/2014 | Snyder | |
| 2014/0290254 A1 | 10/2014 | Manning et al. | |
| 2014/0294564 A1 * | 10/2014 | Matwey | F04D 29/444 415/58.3 |
| 2015/0354461 A1 | 12/2015 | Meier et al. | |
| 2015/0377074 A1 | 12/2015 | de Diego et al. | |
| 2016/0090912 A1 | 3/2016 | Joshi et al. | |
| 2016/0115916 A1 | 4/2016 | Kinsey, Jr. et al. | |
| 2016/0123154 A1 * | 5/2016 | Manning | F02C 7/052 416/90 R |
| 2016/0123227 A1 | 5/2016 | Murray et al. | |
| 2016/0177823 A1 | 6/2016 | Younes et al. | |
| 2016/0186601 A1 | 6/2016 | Manning et al. | |
| 2016/0265434 A1 | 9/2016 | Snyder | |
| 2016/0363051 A1 | 12/2016 | Snyder et al. | |
| 2017/0211475 A1 | 7/2017 | Mayer et al. | |
| 2017/0284226 A1 * | 10/2017 | Nasir | F01D 25/32 |
| 2017/0363000 A1 | 12/2017 | Kiszewski | |
| 2018/0021711 A1 * | 1/2018 | Mook | F01D 25/32 95/269 |
| 2018/0023473 A1 * | 1/2018 | Manteiga | F02C 9/18 95/34 |
| 2018/0023595 A1 * | 1/2018 | Mook | F01D 5/085 415/1 |
| 2018/0058323 A1 | 3/2018 | Smith, III et al. | |
| 2018/0135516 A1 * | 5/2018 | Nasir | F04D 29/444 |

OTHER PUBLICATIONS

Extended EP Search Report for Application No. 17157027.8-1607 dated Aug. 25, 2017.
Shakeel Nasir et al.; Turbine Engine Designs for Improved Fine Particle Separation Efficiency; USPTO U.S. Appl. No. 15/085,625 dated Mar. 30, 2016.
Shakeel Nasir et al.; Scavenge Methodologies for Turbine Engine Particle Separation Concepts; USPTO U.S. Appl. No. 15/352,839, filed Nov. 16, 2016.

* cited by examiner

SYSTEMS AND METHODS FOR TURBINE ENGINE PARTICLE SEPARATION

STATEMENT REGARDING FEDERALLY SPONSORED RESEARCH OR DEVELOPMENT

This invention was made with Government support under W911W6-16-2-0012 awarded by the Army Contracting Command—Redstone/AATD. The Government has certain rights in this invention.

TECHNICAL FIELD

The present disclosure generally relates to turbine engine technologies. More particularly, the present disclosure relates to systems and methods for turbine engine particle separation.

BACKGROUND

Turbine engines are used for a number of purposes, including propulsion and/or driving various other components with electrical, pneumatic, and/or hydraulic power, and may include both propulsion engines (for air, land, and sea vehicles, for example) and auxiliary power units (APUs). Generally, a turbine engine includes a compressor section, a combustion section, and a turbine section. During operation, the compressor section draws in ambient air, compresses the air with one or more compressors, and supplies the compressed air to the combustion section. In addition to the compressed air, the combustion section receives fuel via a fuel injection assembly, mixes the fuel with the compressed air, ignites the air/fuel mixture, and supplies the high energy combustion gases to the turbine section to drive one or more turbines, including a shaft that may be used to drive the compressor and otherwise generate power.

During operation, the ambient air drawn into the engine may contain undesirable particles, such as sand and dust, which may cause performance degradation, wear, increased maintenance, and eventually removal and rehabilitation of engines. This is especially true in hot and dry environments, such as desert climates, where such particles are more prevalent in the ambient air. In order to prevent or at least minimize the impacts of particle ingestion into the engine, many vehicles use an inlet particle separator system, disposed upstream of the engine compressor section, to remove at least a portion of the undesirable particles.

Conventional inlet particle separators, such as those described above, operate at relatively high efficiencies for relatively large particles (e.g., > about 20 microns and < about 1000 microns in greatest cross-sectional length). However, for relatively small particles (e.g., <=about 20 microns in greatest cross-sectional length), the efficiencies can be relatively low, resulting in a significant amount of these relatively small particles being ingested into the engine. These relatively small particles may have deleterious effects on the turbine engine during operation. For example, these particles may obstruct secondary flow lines and/or may melt and form glass on relatively hot engine components, such as the combustor or turbine, which can reduce performance and the operating life of the engine.

Accordingly, it would be desirable to provide improved systems and methods for turbine engine particle separation. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to turbine engine designs, including propulsion engines and APUs, which utilize particle separation concepts. These particle separation concepts may be implemented in addition to or as an alternative to those presently-known methodologies used with conventional inlet particle separators deployed upstream of the turbine engine compressor section.

In one exemplary embodiment, disclosed is a turbine engine incorporating a fine particle separation means. The turbine engine includes a compressor that rotates about an axis, and which compresses air fed thereto and a diffuser located downstream and radially outward, with respect to the longitudinal axis, from the compressor, and which decreases a velocity of and increases a static pressure of the compressed air exiting the radial compressor. The turbine engine further includes a flow path positioned downstream, with respect to the longitudinal axis, from the diffuser, wherein the flow path comprises an outer annular wall and an inner annular wall between which the compressed air flows, and wherein the flow path comprises an arc that redirects the compressed air from flowing in a substantially radial flow direction to a substantially axial flow direction. Still further, the turbine engine includes an extraction slot in the outer annular wall that fluidly connects with a scavenge plenum, the scavenge plenum being positioned adjacent to and radially outward, with respect to the longitudinal axis, from the outer annular wall at a position downstream axially along the flow path from the arc, the extraction slot also being positioned downstream axially along the flow path from the arc and an aspiration slot, downstream from the extraction slot, that allows air from the plenum to recirculate back into the flow path.

This Brief Summary is provided to describe select concepts in a simplified form that are further described in the Detailed Description. This Brief Summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
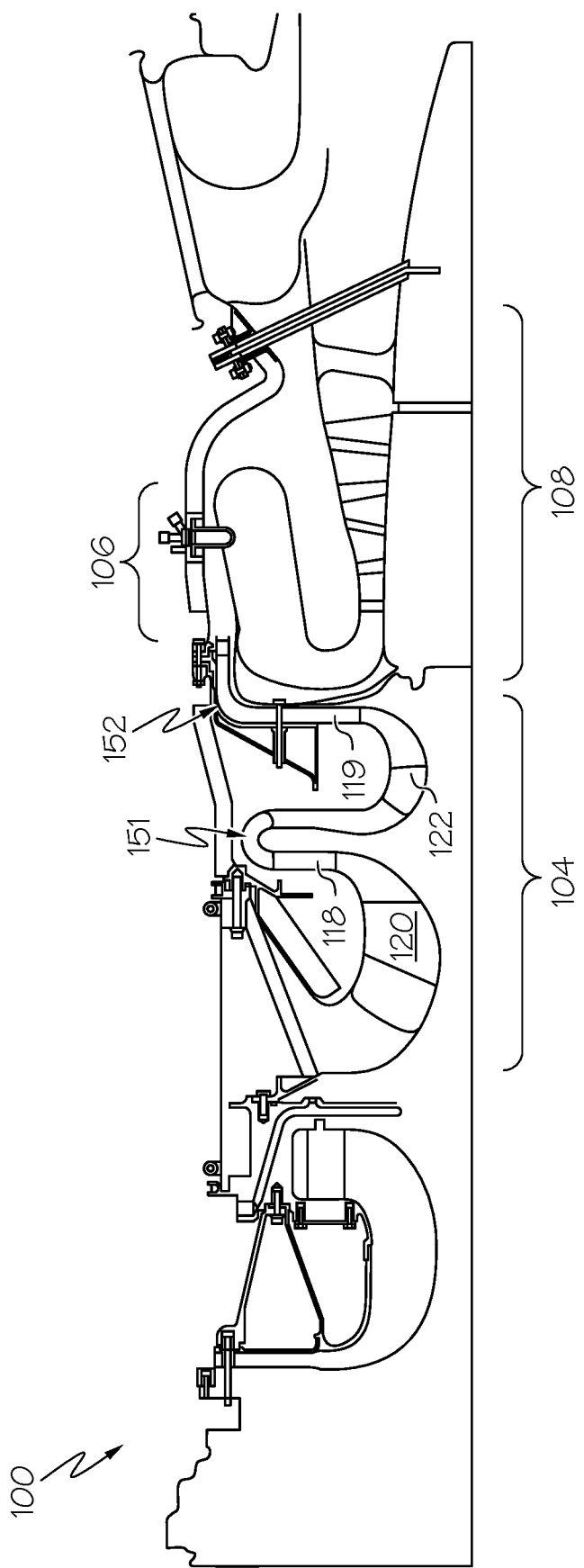
FIG. 1 is a simplified cross-sectional side view of an exemplary turbine engine according to an embodiment of the present disclosure.

The following detailed description is merely exemplary in nature and is not intended to limit the invention or the application and uses of the invention. As used herein, the word "exemplary" means "serving as an example, instance, or illustration." Thus, any particle separation methodology embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. As further used herein, the word "about" means a possible variance (+/−) of the stated value of up to 10%, or alternatively up to 5%. Furthermore, there is no intention to be bound by any expressed or implied theory presented in the preceding technical field, background, brief summary, or the following detailed description. For example, the present disclosure discusses computational fluid dynamics (CFD), which should be understood as a non-limiting theory.

By way of introduction, the following concepts are applicable to the particle separation methodologies presented in this disclosure. First, in accordance with some embodiments of the disclosed methodologies, the relatively-small particles noted above can be efficiently collected into a scavenge plenum, located downstream of the compressor section of the turbine engine, with zero scavenge flow. This means that there is no flow loss or continuous "bleed" flow required to operate these methodologies. In this manner, all of the compressed air is able to ultimately travel downstream, with no loss of engine performance.

Next, in accordance with some embodiments of the disclosed methodologies, a relatively high tangential velocity (as used herein, for example in the case of a centrifugal compressor, "tangential" velocity refers to the air flow vector tangent to the radial velocity component of the compressor at any point along the shroud; the term "relatively high" will be understood to be engine-design specific, but generally denotes a tangential velocity that is at least 50% of the tangential velocity of the air immediately upon exit from the compressor) is maintained within the scavenge plenum, which causes the small particles in the scavenge plenum to remain at a relatively high flow radius (as used herein, the flow "radius" refers to the radial distance from the longitudinal (rotational) axis of the operating turbine engine). This relatively high tangential velocity may be accomplished by adequate air flow exchange in and out of the scavenge plenum as the engine is operating. The air flow exchange may be aided by the inclusion of an aspiration slot, downstream of the primary extraction slot, that connects the scavenge plenum to the deswirl section. The aspiration effect of the downstream aspiration slot is such that it allows air to recirculate out of the scavenge plenum and return to the compressor flowpath without disrupting the particle-capture flowfield at the primary extraction slot.

As initially noted above, a gas turbine engine may be used to power various types of vehicles and systems. Various turbine engine implementations may include a fan section, a compressor section, a combustor section, a turbine section, and an exhaust section. The scavenge plenums described herein are typically implemented after a compressor section but before the combustor section, and accordingly the present disclosure focuses on those two sections of the turbine engine primarily. In some turbine engines, the compressor section is implemented with a centrifugal-type compressor. In other turbine engines, the compressor section is implemented with a mixed-flow-type compressor. The presently-described methodologies should be understood as equally-applicable to either type of compressor design, as both types introduce a tangential component to the air flow. Moreover, it should be appreciated that the particle separation methodologies are equally applicable to single or dual stage compressors, and that the scavenge plenum may be introduced in the turbine engine design after either or both compressor stages in the case of a dual stage compressor design.

As but one (non-limiting) example of the foregoing turbine engines to which the present disclosure is applicable, reference is now made to FIG. 1, which illustrates a simplified cross-sectional side view of an exemplary turbine engine according to an embodiment of the present disclosure, and includes a compression section 104 that has a first and a second compressor 120, 122, a combustor section 106, and a turbine section 108. As illustrated, subsequent to a diffuser 118 connected with the first compressor 120 is located a bending or arcuate section 151, wherein the air flow changes abruptly from radial to axial. Section 151 would be a suitable location to place the small particle separation means of the present disclosure. Also shown, downstream of the first compressor is the second compressor 122, and its associated diffuser 119, subsequent to which is another arcuate section 152, which also is a suitable location to place the small particle separation means of the present disclosure. Broadly speaking, though, FIG. 1 merely provides an exemplary of one turbine design, and many others are possible in accordance with the present disclosure. Thus, the present disclosure should not be thought of as limited with regard to the placement of the small particle separation means to any particular compressor design or compressor stage.

Figure 2:
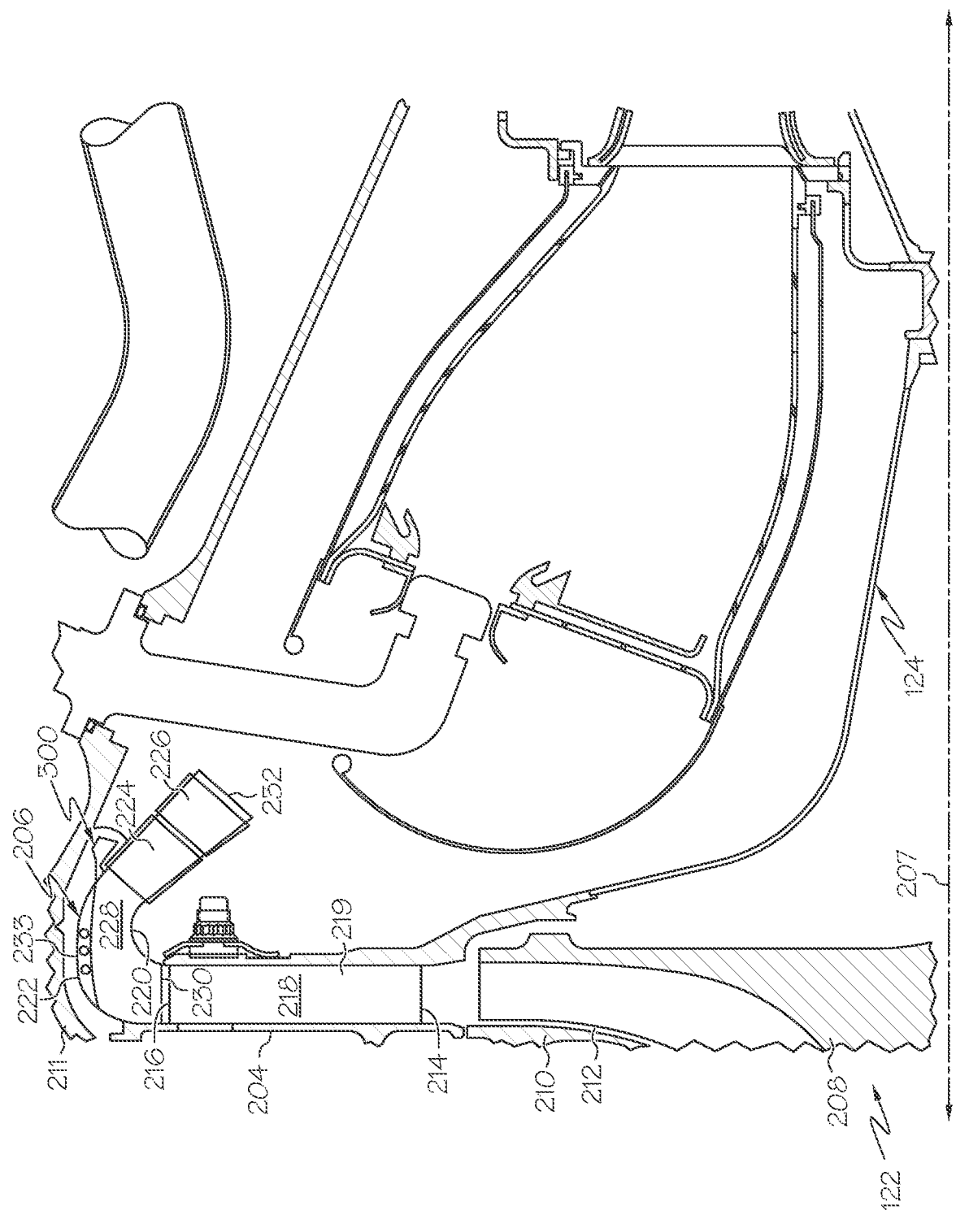
FIG. 2 is a cross-sectional view of portions of exemplary compressor and combustor sections of a turbine engine.

For discussion of the particle separation concepts of the present disclosure, FIG. 2 is a cross-sectional view of exemplary compressor and combustion sections of a gas turbine engine, showing the area between a centrifugal compressor 122 and an annular combustor 124 is illustrated. In general, it should be appreciated that for a diffusion system, which sorts the fine sand particles towards the shroud, the particle separation concept may include a circumferential slot and scavenge volume placed in the shroud downstream of the diffuser in the bend and deswirl section. The bend and deswirl section is designed such to reduce excessive adverse pressure gradient (i.e. prone to flow separation) to improve sand separation by the slot placed in the shroud region.

Accordingly, as shown in FIG. 2, compressor 122 may be a single stage compressor, or it may be the second (high pressure) stage of a dual stage compressor. In addition to the compressor 122 and combustor 124, FIG. 2 depicts a radially-oriented diffuser 204 and a deswirl assembly 206, each disposed about a longitudinal axis 207. In this embodiment, as noted above, the compressor 122 is embodied as a centrifugal compressor and includes an impeller 208 and a shroud 210 disposed in a compressor housing 211. The impeller 208, as alluded to above, is driven by a turbine and rotates about the longitudinal axis 207. The shroud 210 is disposed around the impeller 208 and defines an impeller discharge flow passage 212 therewith that extends radially outward from longitudinal axis 207. While a radial compressor 122 is disclosed, other types, including mixed flow, may be employed as well in other embodiments; as such, the configuration shown in FIG. 2 should be considered non-limiting.

The diffuser 204 is coupled to the shroud 210 and is configured to decrease the velocity and increase the static pressure of air that is received from impeller 208. In this regard, a diffuser 204 including a plurality of vanes 219 suitable for operating with a compressor may be employed. In any case, the diffuser 204 includes an inlet 214, an outlet 216, and a flow path 218 that each communicates with the impeller discharge flow passage 212, and the flow path 218 is configured to direct the received air flow radially outward.

The deswirl assembly 206 communicates with the diffuser 204 and is configured to substantially remove swirl from air received therefrom, to thereby decrease the Mach number of the air flow. The deswirl assembly 206 includes an inner annular wall 220, an outer annular wall 222, and pluralities of vanes 224, 226 disposed between the inner annular wall 220 and the outer annular wall 222. In general, the blade shape of these vanes 224, 226 may be designed such to sort the particles to the shroud to improve fine sand separation effectiveness of the splitter-bleed system.

Furthermore, the walls 220, 222 define a flow path 228 that is configured to redirect the air from its radially outward direction to a radially inward and axially downstream direction. In this regard, the walls 220, 222 are formed such that the flow path 228 extends between an inlet 230 and outlet 232 in an arc 233 so that when the air exits the outlet 232, it is directed at an angle toward the longitudinal axis 207 and the annular combustor 124. As the angle of the arc 233 is increased the variation of the air angle between the inner wall 220 and out wall 222 is increased. The vanes 224, 226 reduce the tangential (circumferential) flow component of the air. Accordingly, scavenge plenums in accordance with the present disclosure are typically implemented prior to (upstream of) the vanes 224, 226, in order to maintain the relatively high tangential flow within the scavenge plenums, consistent with the methodologies described herein.

As noted above, a turbine engine may be configured with an inlet particle separator, located upstream of the compressor section, for purposes of efficiently removing relatively large particles from the inlet air stream. However, finer particles, such as those smaller than about 20 microns may elude the inlet particle separator, and proceed into the turbine engine compressor section. With continued reference to FIG. 2, in one embodiment, a small particle separation means 300 may be embodied as a scavenge plenum connected to the deswirl assembly flow path 228 using an extraction slot through the deswirl assembly outer annular wall 222 downstream of the arc 233. In general, the extraction slot may vary in shape (i.e. size) and location (i.e. meridional) in the circumferential direction to improve fine sand particles separation effectiveness affected by the circumferential flow field such as diffuser wake. Moreover, in any particular embodiment, multiple slots and their associated scavenge volumes may be used along meridional length to improve fine sand separation effectiveness.

Figure 3:
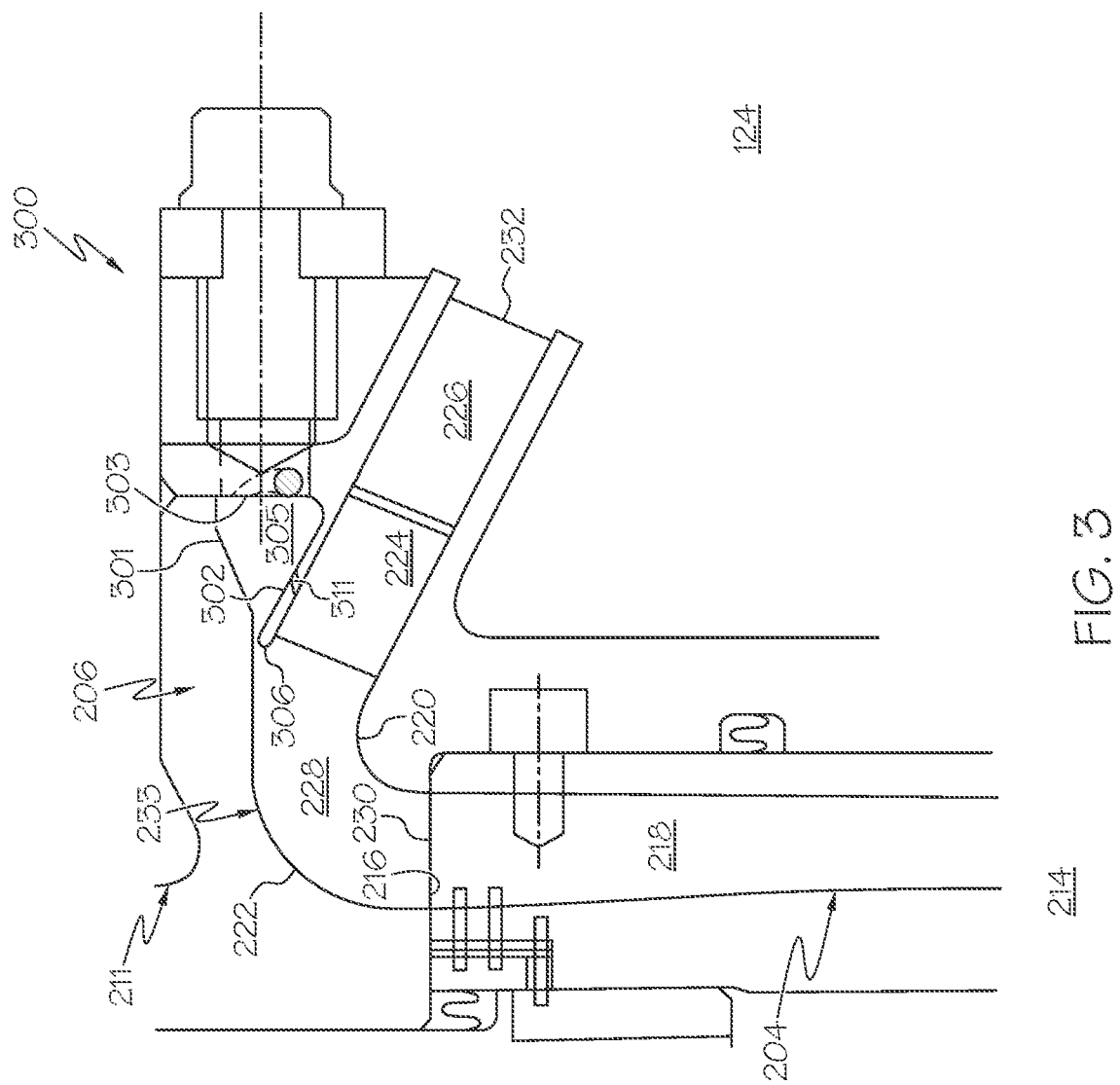
FIG. 3 is a cross-sectional view of a small particle separation means of a turbine engine as in FIG. 2 in accordance with some embodiments of the present disclosure.
Figure 4:
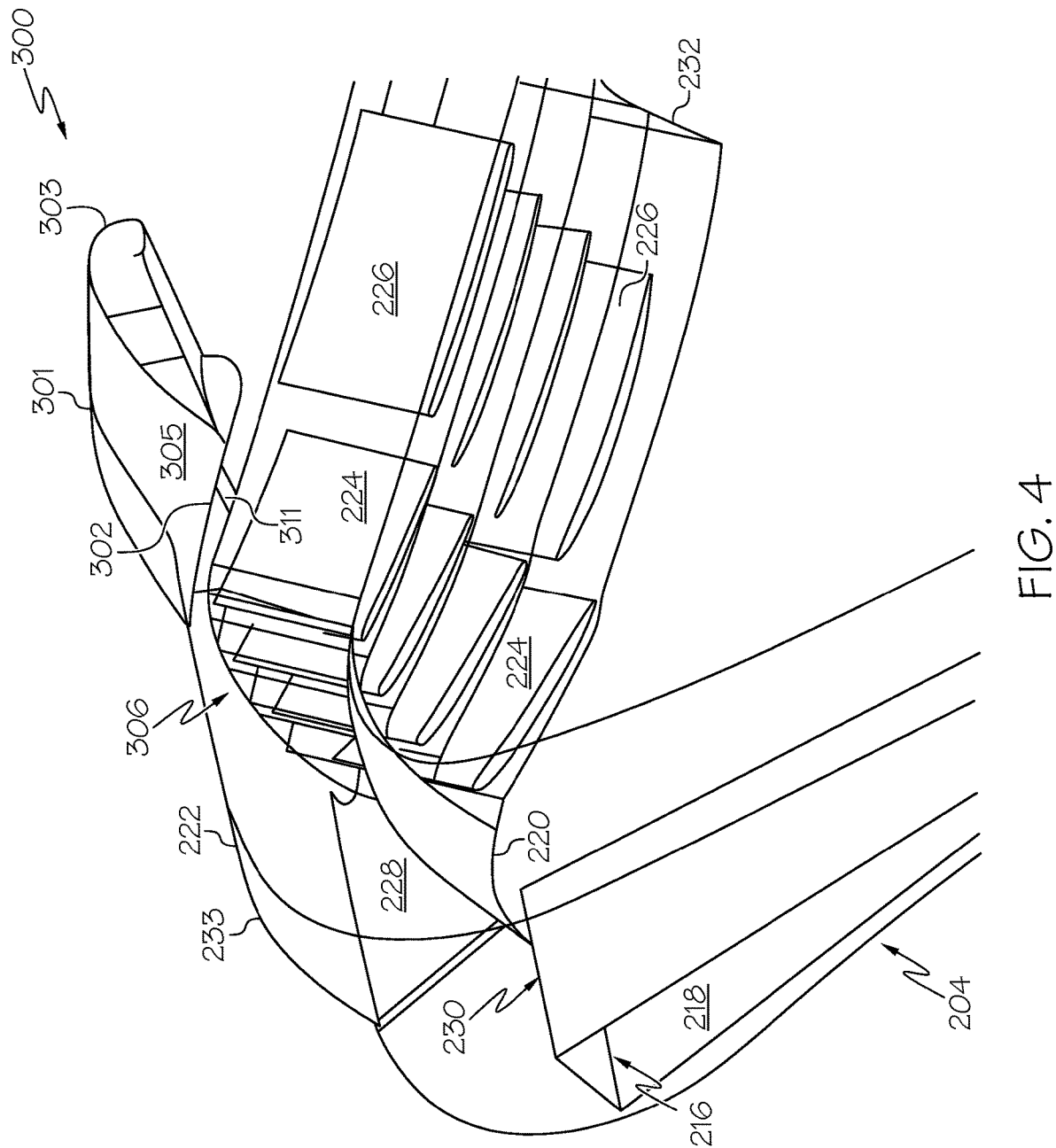
FIG. 4 is a perspective view of a small particle separation means of a turbine engine as in FIG. 2 in accordance with some embodiments of the present disclosure.

Accordingly, turning now to the small particle separation means 300, as detailed in FIGS. 3-4, illustrated in particular is the deswirl assembly flow path 228, which as noted above is formed between the inner and outer deswirl annular walls 220, 222. As shown, the compressed air, once passing through the diffuser 204 (via diffuser flow path 218), enters into the deswirl assembly 206 at the deswirl inlet 230. The deswirl assembly arc 233 changes the flow direction of the compressed air from a radially outward direction from the longitudinal axis 207, to an axially rearward direction (towards the combustor section 124) that also include a small radially inward (downward) component, as illustrated. With the use of computational fluid dynamics (CFD), it has been discovered that small particles in the compressed air flow stream tend to track closely to the outer annular wall 222 as the flow changes from the radially outward direction to the axially rearward direction (i.e., along the arc 233).

The extraction slot 306 may be embodied as a continuous circumferential slot, a discontinuous circumferential slot or as a series of circumferentially-disposed holes/apertures of any shape or count. The extraction slot is axi-symmetrical (with regard to axis 207), and may encompass from about 1% to about 25%, such as about 1% to about 15%, of the area (along a plane perpendicular to the longitudinal axis 207) of the flow path 228, said plane being circumscribed by the housing 211. The extraction slot 306 is located along the deswirl flow path 228 at a position downstream of the arc 233, yet prior to the plurality of vanes 224, 226, and as such a relatively high tangential flow remains in the air as it encounters the slot 306. Further, the tangential velocity is maintained via continuous air flow in and out of the slot, but with zero scavenge flow (i.e., zero flow loss from the scavenge plenum 305).

In one embodiment, the scavenge plenum 305 is located radially outward from the deswirl assembly 206 at a position that is radially adjacent to the first (upstream) plurality of vanes 224. The scavenge plenum 305 includes an inner radial wall 302, an outer radial wall 301, and an axial end wall 303 positioned at an opposite axial (downstream) end of the plenum 305 with respect to the extraction slot 306. In one embodiment, as illustrated, that a radius of the outer radial wall 301 that connects with the axial end wall 303 is greater than the radius at which the extraction slot 306 is located, and likewise, it is preferred that a radius of the inner radial wall 302 that connects with the axial end wall 303 is at a lower radius than the radius at which the extraction slot 306 is located, all with respect to the longitudinal axis 207. In the illustrated embodiment, the aforesaid small radially inward component of the flow direction is commenced at the plurality of vanes 224, 226 by the vanes 224, 226 being oriented somewhat radially inward (e.g., about 10 to about 45 degrees). As such, the inner radial wall 302 of the scavenge plenum 305 may also have the same radial declination so as to remain parallel and adjacent to the first plurality of vanes 224, as noted above. Again, the blade shape of these vanes 224, 226 may be designed such to sort the particles to the shroud to improve fine sand separation effectiveness of the splitter-bleed system.

As initially noted above, the scavenge plenum 305 also includes a second, aspiration slot 311. The aspiration slot 311 may connect that scavenge plenum 305 volume to the deswirl flow path 228 downstream of the extraction slot 306, and as such passes through the deswirl outer annular wall 222 and the inner radial wall 302 of the plenum 305. The aspiration slot 311 may be of any shape or size, but generally has width of about 0.1 times to about 10 times the width of the extraction slot 306. One or more aspiration slots 311 may be provided for a given scavenge plenum. The aspiration slot 311 may be angle axially upstream (as shown) or downstream, or it may be oriented substantially radially. The aspiration slot 311 may provide an aspiration effect to keep captured particles in the scavenge volume and improve sand separation effectiveness. The aspiration effect of the aspiration slot 311 is such that it allows air to recirculate out of the scavenge volume and return to the compressor flow path without disrupting the particle-capture flow field at the extraction slot 306.

Once collected, fine sand particles can be purged out of the scavenge volume with or without active scavenge flow. The particles separate first into the scavenge volume 305 and then a scavenge "purge" operation can be accomplished (i.e. at engine shutdown) with no performance loss to the engine cycle. In addition, the scavenge plenum 305 can be purged intermittently during engine operation. Suitable purge systems and methods are described in commonly-assigned U.S. patent application Ser. No. 15/352,839 (published as U.S. Patent Application Publication no. 2018/0135516 A1), the contents of which are herein incorporated by reference in their entirety.

Figure 5:
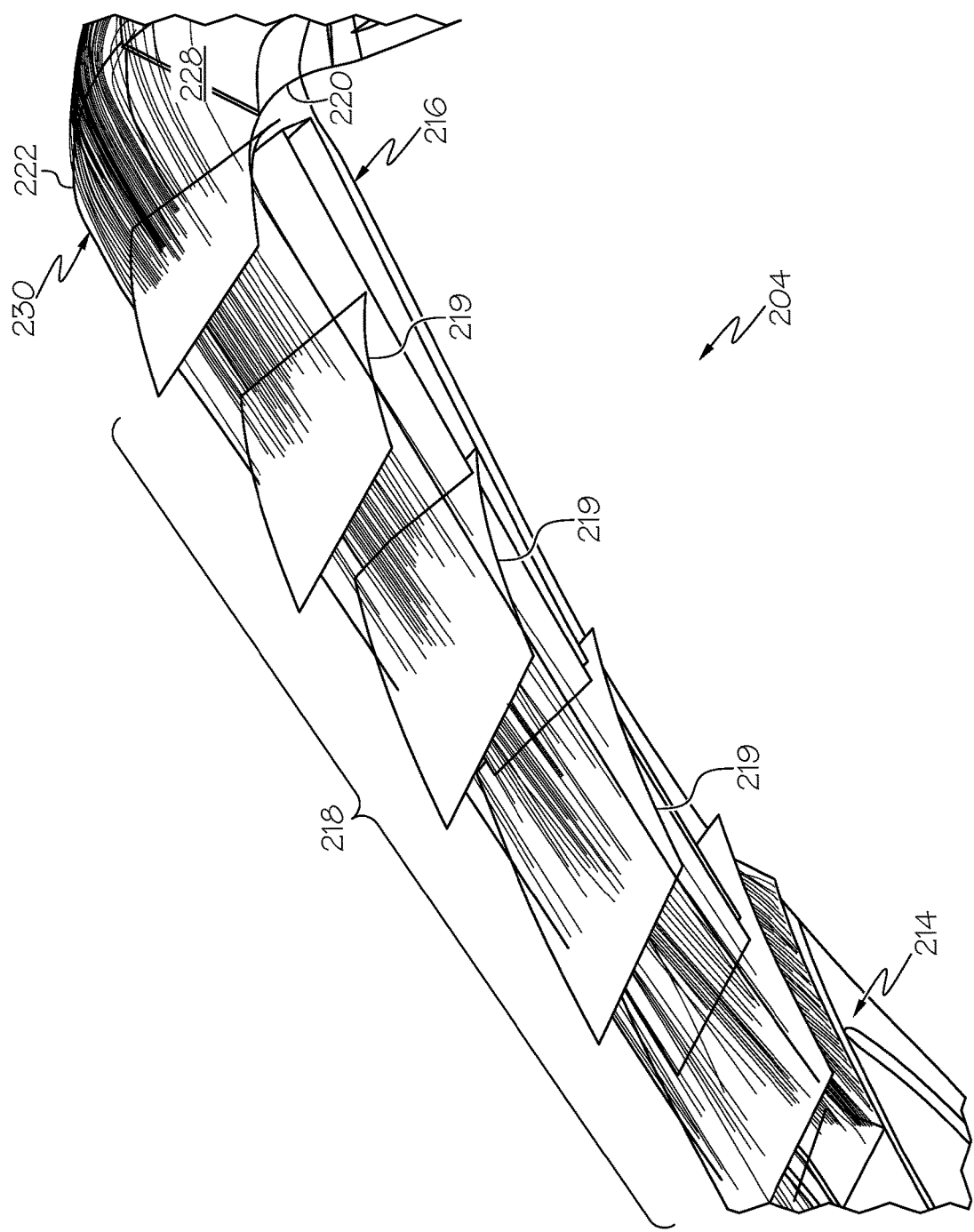
FIG. 5 illustrates a small particle flow simulation through a diffuser section of a turbine engine that incorporates the small particle separation means of FIGS. 3-4.
Figure 6:
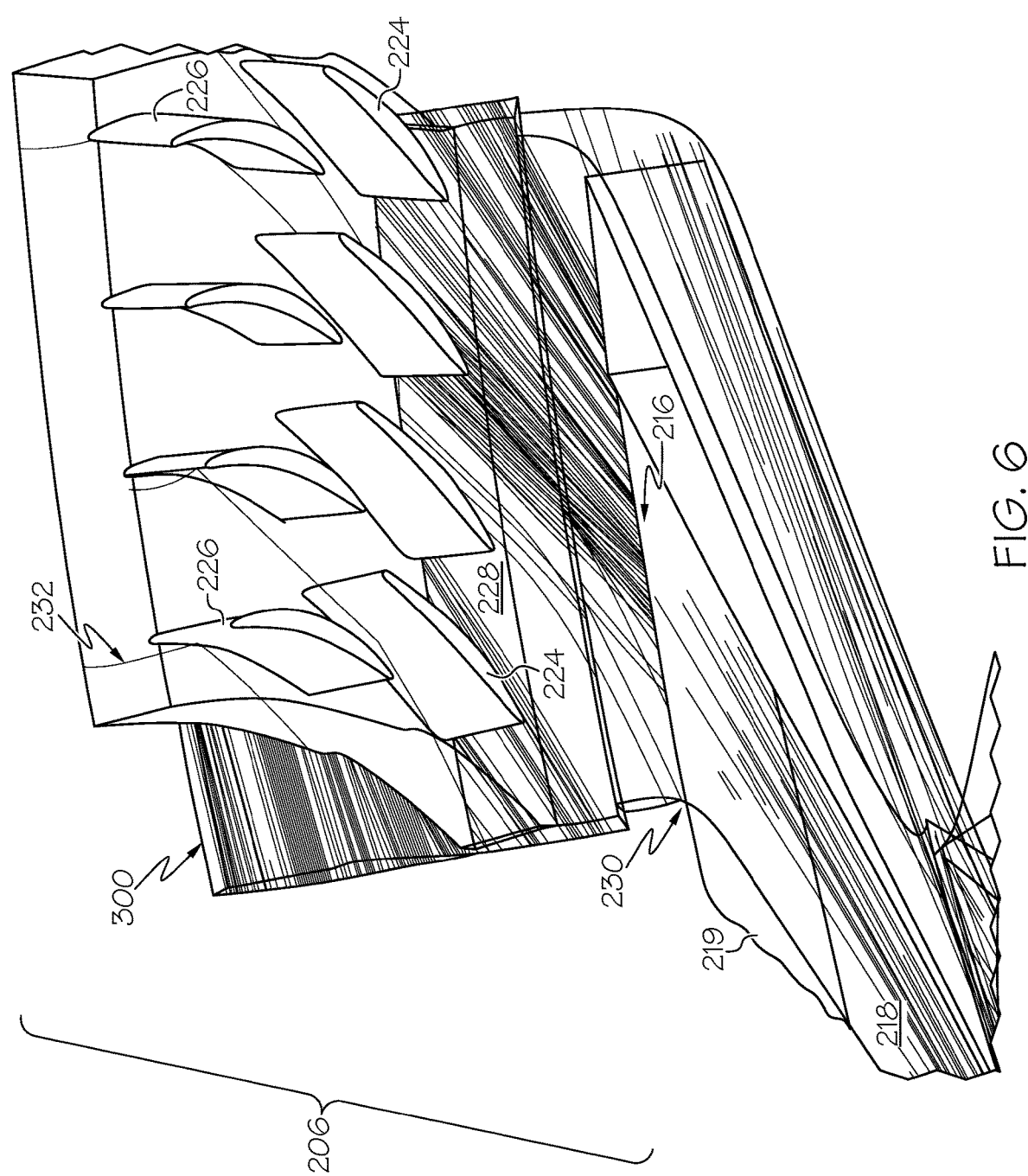
FIG. 6 illustrates a small particle flow simulation through a deswirl section of a turbine engine that incorporates the small particle separation means of FIGS. 3-4.

In operation, therefore, the compressed air that exits the diffuser 204 at diffuser outlet 216 will enter the deswirl assembly at inlet 230. FIGS. 5 and 6 illustrate this effect, using computational flow dynamics FIG. 5 illustrates a small particle flow simulation through a diffuser section of a turbine engine that incorporates the small particle separation means of FIGS. 3-4, and FIG. 6 illustrates a small particle flow simulation through a deswirl section of a turbine engine that incorporates the small particle separation means of FIGS. 3-4. As can be seen, any small particles in the compressed air, as it passes through the deswirl flow path 228, will tend to track along the arc 233 of outer annular wall 222. Prior to encountering the plurality of vanes 224, 226 (and thus prior to the radial declination at the vanes), the small particles will be extracted from the flow path 228 at the extraction slot 306 located along the outer annular wall 222, and enter into the scavenge plenum 305. The aspiration slot 311 assists in scavenge efficiency of the small particles. In this manner, the small particles are efficiently prevented from entering the combustor section 124, which as illustrated, is positioned axially downstream from the second plurality of vanes 226 and deswirl assembly outlet 232.

As such, the present disclosure has provided systems and methods for turbine engine particle separation. The particle separation concept may include a circumferential slot and scavenge volume placed in the shroud downstream of the diffuser in the bend and deswirl section. The bend and deswirl section is designed such to reduce excessive adverse pressure gradient (i.e. prone to flow separation) to improve sand separation by the slot placed in the shroud region. The air flow exchange may be aided by the inclusion of an aspiration slot, downstream of the primary extraction slot, that connects the scavenge plenum to the deswirl section. The aspiration effect of the downstream aspiration slot is such that it allows air to recirculate out of the scavenge plenum and return to the compressor flowpath without disrupting the particle-capture flowfield at the primary extraction slot. The extraction slot may vary in shape (i.e. size) and location (i.e. meridional) in the circumferential direction to improve fine sand particles separation effectiveness affected by the circumferential flow field such as diffuser wake. Moreover, in any particular embodiment, multiple slots and their associated scavenge volumes may be used along meridional length to improve fine sand separation effectiveness. Furthermore, the blade shape of the deswirl vanes may be designed such to sort the particles to the shroud to improve fine sand separation effectiveness of the splitter-bleed system. The disclosed systems and methods exhibit improved particle separation efficiency, particularly with regard to small sand particles. As noted above, these scavenge methodologies may be implemented in addition to or as an alternative to conventional inlet particle separators, and may be located at positions within the engine that are different as compared to conventional inlet particle separators, for example in a compressor section (radial, mixed-flow) anywhere there is an abrupt change in flow path from the radial direction to the axial direction. In general, the systems and methods are applicable to all types of compressor designs/stages for all types of turbine engines.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine engine incorporating a fine particle separation means, the turbine engine comprising:
   a radial compressor that rotates about an axis, and which compresses air fed thereto;
   a diffuser located downstream and radially outward, with respect to a longitudinal axis of the turbine engine, from the radial compressor, and which decreases a velocity of and increases a static pressure of the compressed air exiting the radial compressor;
   a flow path positioned downstream, with respect to the longitudinal axis, from the diffuser, wherein the flow path comprises an outer annular wall and an inner annular wall between which the compressed air flows, and wherein the flow path comprises an arc that redirects the compressed air from flowing in a substantially radial flow direction to a substantially axial flow direction;
   an extraction slot in the outer annular wall that fluidly connects with a scavenge plenum, the scavenge plenum being positioned adjacent to and radially outward, with respect to the longitudinal axis, from the outer annular wall at a position downstream axially along the flow path from the arc, the extraction slot also being positioned downstream axially along the flow path from the arc, wherein the extraction slot comprises a radial spacing between the outer annular wall of the flow path and an inner radial wall of the scavenge plenum, the extraction slot configured to direct a portion of the compressed air containing fine particles from the flow path into the scavenge plenum, the scavenge plenum configured to separate the fine particles from the portion of the compressed air; and
   an aspiration slot, downstream from the extraction slot with respect to a flow along the flow path, the scavenge plenum configured to recirculate the portion of compressed air in the scavenge plenum back into the flow path using the aspiration slot, wherein the aspiration slot comprises an opening from the scavenge plenum to a deswirl assembly positioned downstream from the extraction slot with respect to the flow along the flow path that passes through the inner radial wall of the scavenge plenum, such that the aspiration slot directs the portion of compressed air back into the flow path at the deswirl assembly.

2. The turbine engine of claim 1, wherein the flow path comprises a portion of the deswirl assembly.

3. The turbine engine of claim 2, wherein the deswirl assembly comprises a plurality of vanes that reduce a tangential component of the compressed air, the plurality of vanes being located downstream from the arc.

4. The turbine engine of claim 3, wherein the scavenge plenum is positioned adjacent to and radially outward from, with respect to the longitudinal axis, the plurality of vanes.

5. The turbine engine of claim 4, wherein the aspiration slot is oriented axially upstream with respect to the flow path.

6. The turbine engine of claim 4, comprising a plurality of extraction slots and a plurality of aspiration slots.

7. The turbine engine of claim 4, wherein a blade shape of the plurality of vanes of the deswirl assembly are configured to sort fine particles to a shroud of the turbine engine.

8. The turbine engine of claim 1, further comprising a combustion section immediately downstream of the flow path.

9. The turbine engine of claim 1, wherein the turbine engine is a propulsion-type turbine engine or an auxiliary power unit (APU).

* * * * *